United States Patent [19]

Ealey et al.

[11] Patent Number: 4,940,318

[45] Date of Patent: Jul. 10, 1990

[54] GRADIENT MEMBRANE DEFORMABLE MIRROR HAVING REPLACEABLE ACTUATORS

[75] Inventors: Mark A. Ealey, Ayer; Victor G. Salemme, Concord, both of Mass.

[73] Assignee: Itek Corporation, Lexington, Mass.

[21] Appl. No.: 266,616

[22] Filed: Nov. 3, 1988

[51] Int. Cl.⁵ .............................. G02B 5/08; G02B 5/18
[52] U.S. Cl. .................................................... 350/611
[58] Field of Search ............................... 350/607–611; 250/201; 356/353

[56] References Cited

U.S. PATENT DOCUMENTS

| | | | |
|---|---|---|---|
| 3,923,400 | 12/1975 | Hardy | 356/353 |
| 4,492,431 | 1/1985 | Eitel et al. | 350/611 |
| 4,655,560 | 4/1987 | Glomb | 350/611 |
| 4,657,358 | 4/1987 | Anthony et al. | 350/611 |
| 4,674,848 | 6/1987 | Aldrich et al. | 350/611 |
| 4,679,915 | 7/1987 | Kriz et al. | 350/611 |
| 4,734,557 | 3/1988 | Alfille et al. | 350/611 |
| 4,844,603 | 7/1989 | Eitel et al. | 350/611 |
| 4,904,274 | 9/1968 | Fernleib et al. | 350/607 |

Primary Examiner—Jon W. Henry
Attorney, Agent, or Firm—Michael H. Wallach; Robert F. Rotella

[57] ABSTRACT

A deformable mirror is disclosed having replaceable, electrically operable actuators for deforming the mirror's reflecting surface. A flexible retraction membrane is disposed between the actuators and the reflecting surface and the mirror's facesheet is bonded to the retraction membrane. The membrane provides constant contact between the facesheet and the mirror's actuators and provides a deflection load to mechanically drive the facesheet downward against the operation of the actuators, thus providing a mechanical force to deflect the mirror's reflecting surface when electrical signals are selectively removed from one or more of the mirror's actuators. The membrane contains a gradient stiffness in the vicinity of each actuator to tailor the deformation profile, to maintain circular symmetry and to minimize the curve fitting error in the vicinity of each actuator. In one embodiment, the actuators are threaded into threaded apertures in the base which permits the amount of force imparted to each actuator by the retraction membrane to be adjusted.

5 Claims, 2 Drawing Sheets

GRADIENT MEMBRANE DEFORMABLE MIRROR HAVING REPLACEABLE ACTUATORS

BACKGROUND OF THE INVENTION

1. Field of the Invention

This invention relates to deformable mirrors in general, and in particular to deformable mirrors having electrically operated actuators used for deforming the mirror's reflecting surface.

2. Summary of the Prior Art

It is well known in the prior art to use deformable mirrors to correct optical signals for aberrations introduced into a wavefront due to the transmission of an optical signal through a distorting medium, e.g. the earth's atmosphere. Such deformable mirrors may be used, for example, to correct aberrations introduced into laser signals or optical images imaged by a telescope as they pass through the earth's atmosphere, or to introduce known aberrations into a laser signal prior to its transmission through the earth's atmosphere. Examples of deformable mirrors which may be used to perform the foregoing function appear in U.S. Pat. Nos. 3,904,274 and 4,657,358 which are owned by the assignee of the present invention and the teachings of which are incorporated herein by reference. Mirror's of the foregoing type employ a plurality of actuators, for example piezoelectric actuators, which are independently operable to selectively deform areas of a deformable reflecting surface to correct known anomalies contained in an impinging optical signal's wavefront. Signals for driving the actuators to correct the aberrated wavefront may be provided by a wavefront sensing and correction system such as that described in U.S. Pat. No. 3,923,400, the teachings of which are also incorporated herein by reference.

The use of wavefront control systems, for example deformable mirrors, in large aperture optical systems mandates the use of a large diameter mirror to achieve effective wavefront control. Additionally, such a system should ideally also contain a large number of closely spaced actuators to permit adjustments to be made at locations closely spaced together across the deformable mirror's reflecting surface. To accommodate the foregoing requirements, a deformable mirror will frequently require the use of a large number of actuators to achieve effective control of the mirror's reflecting surface.

As noted in U.S. Pat. No. 4,657,358, actuators for use in controlling a deformable mirror may be manufactured from stacks of electrodistortive material, for example lead magnesium niobate (PMN) or lead zirconate titanate (PZT). The electrodistortive material is interleaved in the stack with alternating layers of electrical conductors to permit the application of an electrical signal to the material.

Prior known deformable mirrors which utilize stacked electrodistortive material to provide control of the mirror's reflecting surface have been constructed with the actuators rigidly fastened to the structure supporting the mirror's reflecting surface, for example by cement or a frit bond. Such construction has not provided for the ease of repair of a deformable mirror in the event of a failure of one or more actuators. In the event of the failure of an actuator due, for example, to the mechanical failure of an actuator or to the failure of electrical contacts between one or more layers of electrodistortive material, the components of the mirror had to be carefully disassembled to effect the removal and replacement or repair of the failed actuator. Such a disassembly procedure is time consuming, frequently difficult and often impossible to effect due to the spacing between adjacent actuators and the need to prevent damaging good actuators during the repair procedure. Consequently, there is a need for a deformable mirror which utilizes electrically operated actuators which may be easily replaced without damaging other actuators during the replacement procedure. A related requirement is for a deformable mirror having replaceable actuators which may be easily adjusted during the replacement procedure to control their influence on the deformation of a deformable mirror's reflecting surface.

SUMMARY OF THE INVENTION

Accordingly, a principal object of this invention is to provide a design for a deformable mirror having a large number of closely spaced actuators in which the individual actuators may be easily replaced without disturbing adjacent actuators. Another object is to provide a deformable mirror having a large number of closely spaced actuators in which each actuator may be independently adjusted to optimize its influence in deforming the deformable mirror's reflecting surface.

Another object is to provide a deformable mirror having a large number of actuators which may be electrically operated to provide small, incremental adjustments to the mirror's reflecting surface.

Another object is to provide a deformable mirror whose structure is tailored by gradient stiffness means to provide tailoring of the deformation profile, i.e., the optical influence function and maintains profile symmetry such that the curve fitting function of the deformable mirror has minimal error.

Another object is to provide a deformable mirror in which each actuator is maintained in a compressed state during all times that it is installed in the deformable mirror.

The foregoing and other objects and advantages of the invention are achieved in a deformable mirror having a base containing a plurality of apertures to receive a plurality of removable actuators. Each aperture includes a threaded portion adapted to receive an electrically operable actuator whose length may be varied by the selective application of an electrical signal thereto. Each actuator is electrically operable to permit it to selectively apply a force against a portion of the deformable mirror's reflecting surface. A retraction membrane is fastened to the top portion of the base member along the edge of the base. The retraction membrane is manufactured from a material whose stiffness may be controlled by the material's gradient thickness to apply a compressive force against each actuator and tailor the facesheet deformation profile or influence function. The retraction membrane is designed such that the threaded mechanism of the actuators is used to predeform the membrane to create the membrane's restoring force energy and to be selectively deformed in the area of each actuator as an electrical signal applied to each actuator is varied. A faceplate having a reflecting surface on one side thereof is mechanically fastened to the retraction membrane. Electrical signals applied to each actuator may be selectively varied to change the length of each actuator, thereby selectively mechanically deforming the faceplate's reflecting surface by having the compressive force generated by each actuator transmitted through the retraction membrane. Replacement of a defective actuator may be accomplished by removing the defective actuator to be replaced from its aperture in the base and installing a new actuator to replace the unit which has been removed. If the apertures in the base include threaded portions for receiving the actuators, the new actuators are threaded into the apertures until the top of each replacement actuator contacts the retraction membrane. Thereafter, the electrical connections between the actuator and the deformable mirror's control electronics is restored.

BRIEF DESCRIPTION OF THE DRAWINGS

The above objects and other advantages of the invention will be appreciated after review of the detailed description of a preferred embodiment when read in conjunction with the drawing in which.

DETAILED DESCRIPTION OF A PREFERRED EMBODIMENT

Figure 1:
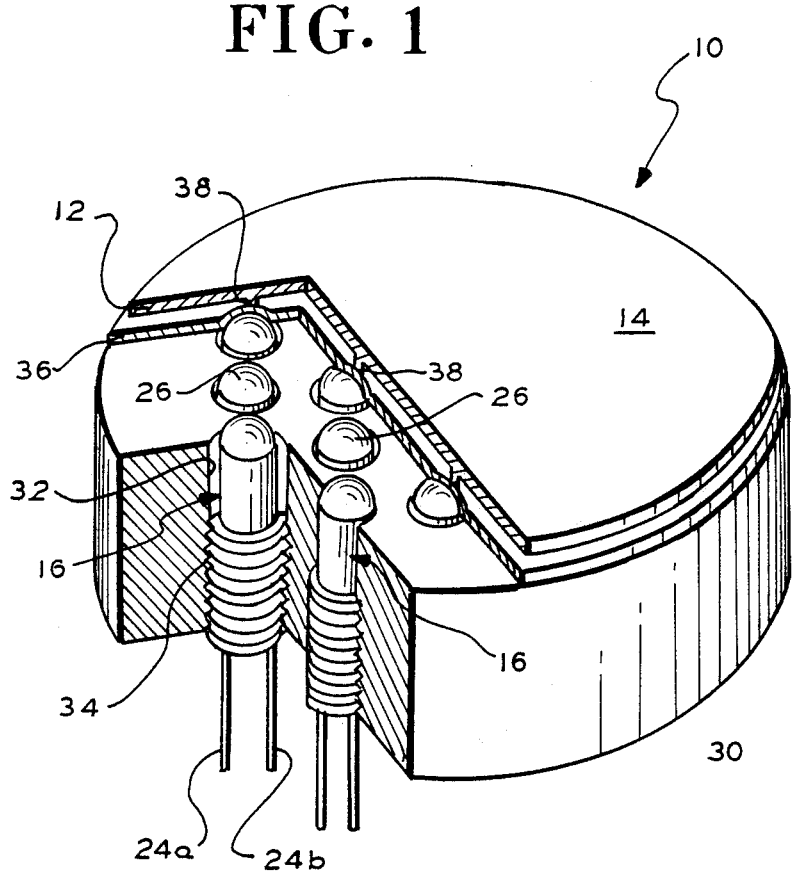
FIG. 1 is a perspective view partially in section of a deformable mirror constructed in accordance with the teachings of the invention.
Figure 2:
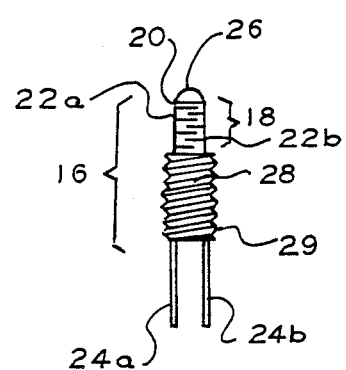
FIG. 2 shows an actuator which may be used to selectively deform the mirror's reflecting surface.

Referring to the drawing, FIG. 1 shows a deformable mirror 10 constructed in accordance with the teachings of the invention. The mirror 10 includes a facesheet 12 having a mirrored surface 14 for correcting aberrated optical signals reflected therefrom, for example laser signals or images from an optical telescope which have become distorted in passing through the atmosphere. Preferably, the facesheet 12 is manufactured from a material which may be polished to form the reflecting surface 14 and which may be deflected by the selective operation of one or more actuators 16. Suitable material for the facesheet 12 includes silicon or ULE (ultra low expansion) glass. As shown in FIG. 2, each actuator 16 includes a body portion 18 which is comprised of a plurality of layers 20 of electrodistortive material, for example lead magnesium niobate (PMN) or lead zirconate titinate (PZT). Interleaved between the layers 20 are alternating layers 22a and 22b of electrical contacts to permit electrical signals to be applied to the layers 20. Thus the layers 20 are connected electrically in parallel and mechanically in series. The contacts 22a and 22b are connected through control electronics to a controlled D.C. source of voltage (not shown) through the leads 24a and 24b. The top of each actuator 16 has fastened thereto a conical pushrod 26 which preferably has a coefficient of thermal expansion matched to the coefficient of thermal expansion of the electrodistortive material forming the body of the actuator 16. Preferably each actuator 16 also includes a lower or plug end 28 used to support the body portion 18 of the actuator i.e., the portion of the actuator which elongates in response to the application of an electrical signal thereto. Preferably each plug end 28 contains a threaded portion having threads 29 on its outside surface.

FIG. 1 shows that the deformable mirror 10 includes a base 30 which is preferably manufactured from a material which has a low coefficient of thermal expansion, for example Invar or silicon. The base 30 includes a plurality of apertures 32 passing therethrough, each of which are adapted to contain an actuator 16. The apertures 32 each include a lower threaded portion 34 which is adapted to receive the threads 29 on the plug end 28 of each actuator 16. Preferably the pitch of the threads 29 on the plug end 28 of each actuator 16 are sufficiently fine to permit precise control of the position of each actuator 16 with respect to the facesheet 12, as the actuator 16 is screwed into the aperture 32, for example 40 or more threads per inch. If the deformable mirror is intended for use with a high power laser or, if it is expected that the operation of the actuators 16 due to their duty cycle will generate excessive heat during their operation, the base 30 may contain fluid channels (not shown) similar to those shown in U.S. Pat. No. 4,657,358 for circulating a coolant therethrough to remove heat from the deformable mirror.

Heretofore, most deformable mirrors which relied on electrodistortive actuators to deform the mirror's reflecting surface employed actuators constructed from an electrodistortive material (for example lead zirconate titinate) bonded between the member containing the reflecting surface and the mirror's base or support structure. In deformable mirrors employing the foregoing construction, the actuators are electrically driven to both impart a deformation to the mirror's reflecting surface and to restore the reflecting surface to its rest position. Deformable mirrors of the foregoing construction are subject to actuator failure because each actuator is alternately subject to both tension and compression forces, placing loads on the bond fastening each actuator to the mirror's base and to the structure containing the mirror's reflecting surface. Such loading is a prime cause for actuator failure, especially in a deformable mirror having a large number of closely-spaced actuators where, of necessity, the surface area occupied by the bond between the top and bottom of each actuator and the components to which each actuator is fastened must be restricted. The operation of multiple layer actuators in both tension and compression subjects such actuators to the further possibility of failure when the actuators are constructed from multiple layers of electrodistortive material which are joined together, for example, by a frit bond which is fired in an oven. Actuators of such construction are prone to failure at the joints between successive layers of electrodistortive material, especially when such joints also contain electrically conductive planes for applying a signal to the multiple layers of electrodistortive material in each actuator.

The present invention avoids the problem of subjecting actuators to tension loads by the use of a retraction membrane 36 which acts as a mechanical spring to place each actuator under a compressive load at all times and to retract the facesheet 12 to its undeformed position when electrical signals are either reduced or removed from one or more of the actuators 16. Thus, the actuators are never required to operate in a condition where they are operating under tension to retract the mirror's facesheet. The retraction membrane 36 serves as electromechanical interface between the actuators 16 and the facesheet 12. Furthermore, the retraction membrane 26 also serves the further function of maintaining intimate contact between each of the actuators 16 and the facesheet 12, even during high frequency, high amplitude operation of the mirror. In addition, by bonding the membrane 36 to the faceplate 12 at pusher pads 40 located on the facesheet 12 above each actuator 16, multiple paths are created to conduct heat generated in the facesheet 12 from the facesheet and into the base 30, thereby reducing the chance of heat distorting the facesheet 12 and degrading the optical quality of the reflecting surface 14. The retraction membrane 36 permits the use of replaceable actuators 16 such as those disclosed herein since the actuators 16 are not required to be mechanically fastened to the facesheet 12.

Figure 3:
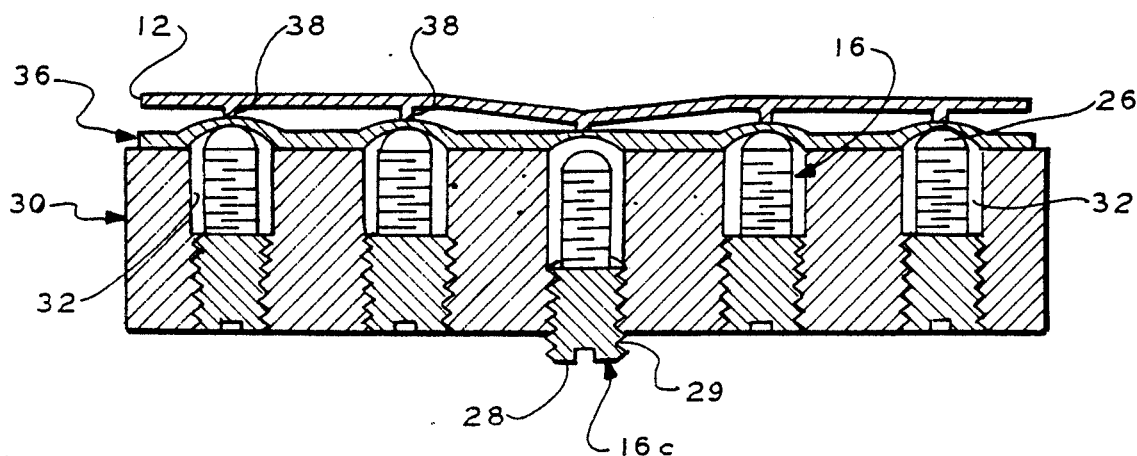
FIG. 3 is a side view of the deformable mirror of FIG. 1.
Figure 4:
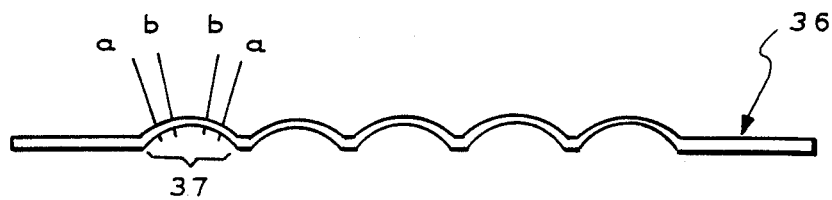
FIG. 4 is a plan view of a gradient stiffness membrane for the deformable mirror.
Figure 5:
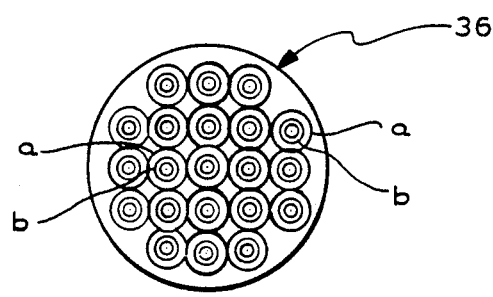
FIG. 5 is a depiction of lines of constant stiffness for locations on the membrane of FIG. 4.

FIG. 3 shows that the retraction membrane 36 is retained to the base 30 by bonding the membrane 36 to the top surface of the base 30 using a frit bond or an epoxy cement. Preferably the bond exists at all locations between the top surface of the base 30 and the bottom surface of the membrane 36, including the areas between the apertures 32. The retraction membrane 36 is manufactured from a material which has a high coefficient of thermal conductivity, a low coefficient of thermal expansion, and which may be flexed by local forces imparted by the elongation of the actuators 16 while having sufficient elasticity to permit retraction of the facesheet 12 by the membrane 36 at locations in which electrical signals to one or more actuators 16 are reduced or removed. Suitable materials include polycrystalline or single crystal silicon. Preferably the retraction membrane 36 is designed with a gradient stiffness to distribute stress over a greater area surrounding each actuator 16 and allow for the tailoring of the deformation shape or profile of the membrane 36. This approach minimizes the possibility of failure of the membrane 36 caused by fatigue in the vicinity of the actuators 16 due to the use of a brittle material for the membrane having a low coefficient of plastic deformation. Preferably the thermal expansion coefficient of the membrane 36 should be matched to the thermal transfer properties of the base 30, the membrane 36 and the facesheet 12. The retraction membrane 36 is manufactured with parallel upper and lower faces. FIG. 4 depicts the shape of the membrane 36 along its edge as it would appear when installed in a deformable mirror between the base 30 and facesheet 12. Locations on the membrane 36 which are to be acted upon by actuators 16, for example location 37 of FIG. 4, are contoured by machining and/or acid etching, for example, to provide a variable thickness, and hence stiffness, at locations surrounding the point at which the center of the end 26 of each actuator 16 would contact the membrane 36. Such contouring tailors the deformation shape (i.e. the influence function) and maintains circular symmetry around the actuator. FIG. 5 shows an isocontour plot of lines of equal thickness around each actuator 16 on the membrane 36. For example, all contour lines "a" are of equal stiffness and all contour lines "b" are of equal stiffness.

The rear surface of faceplate 12 includes a series of pusher pads 38 which may be either formed as a part of the facesheet 12 or bonded thereto. The facesheet 12 is bonded to the retraction membrane 36 at the pusher pads 38 using, for example, a frit bond or an epoxy cement. Pusher pads 38 are each located on the faceplate 12 over the locations at which each actuator 16 would apply pressure to the faceplate 12 and serve to transfer compressive and tensile forces from the retraction membrane 36 into the facesheet 12. Thus, forces generated by the operation of the actuators 16 are transferred through the retraction membrane 36 into the facesheet 12.

Preferably a deformable mirror constructed in accordance with the teachings of the invention is assembled by first bonding a retraction membrane 36 having parallel top and bottom surfaces to the base 30 prior to the installation of any actuators 16. Thereafter the actuators 16 are threaded into each of the apertures 32 and are screwed up against the retraction membrane 36 to deflect the membrane upward, thereby effectively preloading the retraction mechanism. A bias voltage is then applied to the actuators 16 to cause a further upward deflection of the retraction membrane 36. The facesheet 12 is bonded onto the retraction membrane 36 at the pusher pads 38 while the actuators 16 continue to be biased by the applied electrical signal. The surface 14 of the facesheet 12 is then polished to produce a flat reflecting surface while the actuators 16 are being biased against the membrane 36 by the applied electrical signal. In the preferred embodiment, a reflecting coating such as enhanced aluminum or silver may thereafter be deposited on the surface 14.

Operation of a deformable mirror constructed in accordance with the teachings of the invention commences with the application of signals to each of the actuators 16 to drive the facesheet 12 upward against the downward pull imparted to it by the retraction membrane 36, thus resulting in the reflecting surface 14 assuming a flat, planer shape. Selective deformation of the reflecting surface 14 may be achieved by selectively reducing driving signals to one or more of the actuators 16, thereby permitting the retraction membrane 36 to pull down, or retract the facesheet 12 in the areas no longer being biased upward by the actuators 16. The reflecting surface 14 may thereafter be restored to a flat condition by restoring the bias signals to the actuators 16 to provide an upward force to oppose the downward pull of the retraction membrane 36, thereby pushing up the facesheet 12. As is evident from the foregoing, the actuators 16 operate in a "push-pull" configuration, with the upward push of the actuators 16 being opposed by the downward pull of the retraction membrane 36.

FIG. 3 illustrates how an actuator, for example actuator 16c may be removed from the deformable mirror by unscrewing it from the aperture 32 after removal of the electrical leads 24a, 24b. The removed actuator is replaced with a new actuator by threading it into the aperture 32 so that the conical pushrod 26 applies a sufficient force against the retraction membrane 36 to remove any deflection from the reflecting surface 14 of the facesheet 12.

As is evident from the foregoing detailed description of one preferred embodiment, various modifications can be made to the invention without departing from the spirit of the invention. It is not intended to limit the invention to the details herein recited, the intent being to define the invention by the scope of the claims which follow.

We claim:

1. A deformable mirror having a continuous reflective surface, said deformable mirror being comprised of:
    (a) a base having a plurality of apertures passing therethrough;
    (b) a plurality of electrically operable actuators, each of said actuators being manufactured from an electrodistortive material which may be elongated in response to an electrical signal applied thereto, each of said actuators having a rear end portion and a forward extremity, each of said actuators being received in each of said apertures in said base;

(c) means for retaining each of said actuators in each of said apertures;

(d) a facesheet above said base, said facesheet having a reflecting surface on one side thereof for reflecting optical signals therefrom; and (e) a retraction membrane located between said facesheet and said base and fastened to said base and to the side of said facesheet opposite said reflecting surface, each of said actuators having their forward extremities in contact with said retraction membrane, said retraction membrane being manufactured from a material which will flex when one or more of said actuators are biased against said retraction membrane by the application of an electrical signal to one or more of said actuators, and which will provide a restoring force to each of said actuators when electrical signals applied to said actuators are reduced or removed, said retraction membrane further being characterized in that the thickness of said retraction membrane is reduced around the point at which each actuator contacts the retraction membrane to provide symmetrical reduced stress conditions around the point at which each actuator contacts said retraction membrane;

whereby said actuators may have electrical signals applied thereto selectively changed to provide for the controlled deformation of the reflecting surface of the facesheet, said retraction membrane restoring said facesheet to an undeformed state upon the reduction or removal of electrical signals from said actuators.

2. The deformable mirror of claim 1 wherein said facesheet includes pusher pads on the side opposite the reflecting surface, said facesheet being fastened to said retraction membrane at said pusher pads.

3. The deformable mirror of claim 1 wherein each of said actuators may have their position mechanically adjusted with respect to the retraction membrane.

4. The deformable mirror of claim 3 wherein each actuator includes a threaded portion and wherein each aperture in said base has a threaded portion for receiving the threaded portion of said actuator.

5. The deformable mirror of claim 3 wherein each of said actuators is comprised of multiple layers of electrodistortive material.

* * * * *